Figure 4:
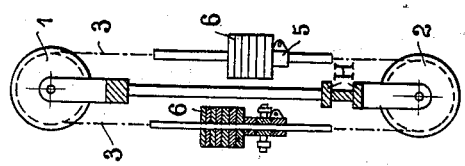

June 5, 1923.
M. SPINDEL
1,457,800
TESTING MACHINE
Filed March 25, 1922    2 Sheets-Sheet 1
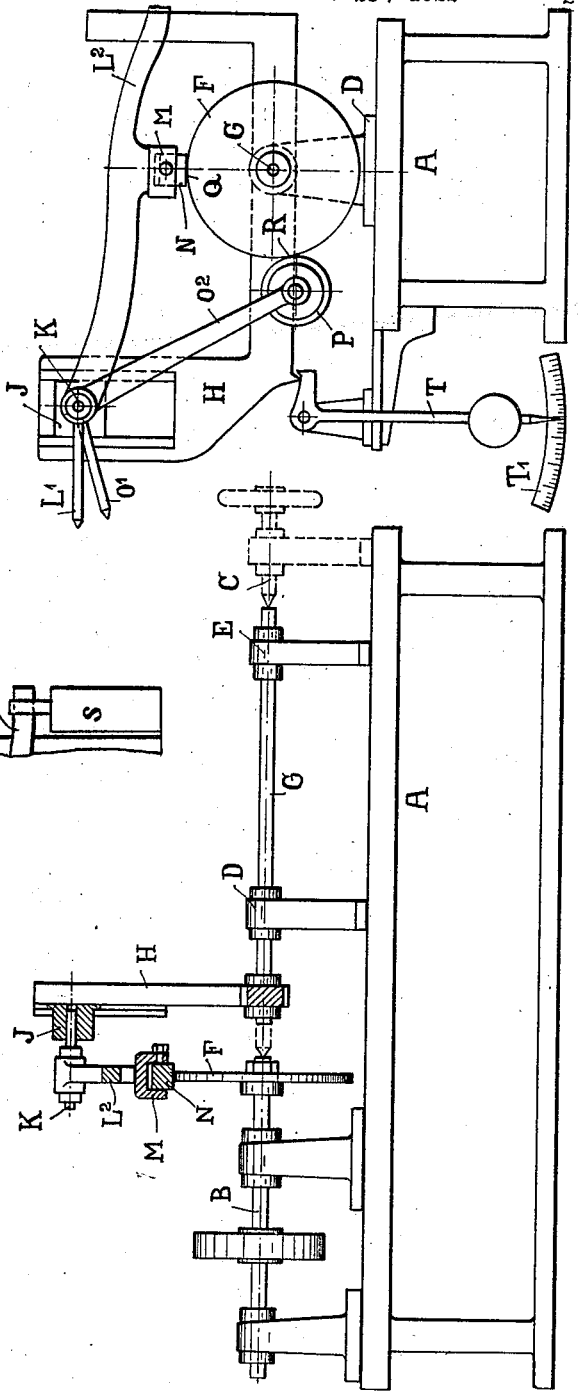
Inventor:
Moses Spindel June 5, 1923.　　　　　　　　　　　　　1,457,800

M. SPINDEL

TESTING MACHINE

Filed March 25, 1922　　　　2 Sheets-Sheet 2

Inventor:
Moses Spindel

Patented June 5, 1923.  1,457,800

UNITED STATES PATENT OFFICE.

MOSES SPINDEL, OF INNSBRUCK, AUSTRIA.

TESTING MACHINE.

Application filed March 25, 1922. Serial No. 546,882.

*To all whom it may concern:*

Be it known that I, MOSES SPINDEL, residing at Innsbruck, Kaiser Josephstrasse No. 15, Austria, have invented certain new and useful Improvements in Testing Machines, of which the following is a specification.

My invention relates to a test machine for testing the resistance of the wear and machining of constructional and machine materials, the quality of tools and the lubricating property of oils and the like. Various constructional forms of such machines have already been proposed, but they were not adapted to be used for all the purposes named at the same time or equally well, as in the case with the new machine according to the invention, which works on entirely new testing principles.

The accompanying drawings illustrate the invention, Fig. 1 being a side view and Fig. 2 a front view. The main part of the machine is formed by a strong frame H, which is rotatably mounted on a shaft G and supports a slide J, which is adapted to be displaced by a screw (not shown) and in which the pivot K of a lever $L_2$ is journalled, with which the test-piece N held in the jaws M can be pressed against the rotating tool F (grinding disc, saw and the like) with a pressure or feed that can be measured. The frame is mounted so as to rotate about the same mathematical axis, about which the tool rotates at an adjustable speed. The frame H is made rotatable about the axis B of the rotating tool F, by the shaft G supporting the frame H being mounted between the centres C or on the slide D of a lathe A or a similar machine with or without steady rests E, while the tool rotates in a similar manner on the shaft B of the lathe. On the test-piece, which is held in the mount M, being pressed by means of the lever against the rotating tool, the pressure being applied by the weight S, the frame H seeks to turn in the same direction. The frame H is prevented from turning with the tool, by exerting at a definite distance from the axis of rotation a measurable pressure or a dynamometer, for instance a pendulum dynamometer T, the frame only turning corresponding to the deflection of the pendulum. This pressure exerted by the frame on the dynamometer is a measure of the tangential force acting between the test-piece and the rotating tool, which force for a known peripheral speed of the tool is at the same time a measure of the work.

The rotation about its pivot of the lever $L_2$ carrying the test-piece N is a measure of the amount of material removed from the test piece itself and the wear on the rotating tool F, while the wear on the rotating tool alone is indicated by the rotary motion of a second lever $O_2$, which is mounted on the same pivot K as the lever carrying the test-piece and is provided with a roller P, which rests against the rotating tool disc F. These two levers $O_2$ and $L_2$, which are mounted on the same pivot, are adapted to be raised and lowered by a slide J, which can be displaced in a simple manner by means of screws, the guide for the slide being so disposed that the arms of the levers $L_2$ and $O_2$ from their common fulcrum K to the points of contact Q between the test-piece and the tool and R for the different diameters of the rotating tool are always equal, i. e. $KN = KR = a$ constant length. The rotary movement of the levers may be read off at their extensions $L_1$ and $O_1$, also the pressure of the frame H on the dynamometer at the scale $T_1$. Rotary registering drums may be provided as described below, which are rotated proportionally to the number of revolutions of the lathe and on which the movements of $L_1$, $O_1$ and of H may be registered to any scale.

The same apparatus may be modified, so that the tool for instance a turning tool or the like, is fixed in the frame, while the test-piece rotates. The frame H, described above, with levers, registering device and dynamometer can also be constructed as a self contained apparatus, which may be mounted on any lathe or similar machine.

Figure 3:
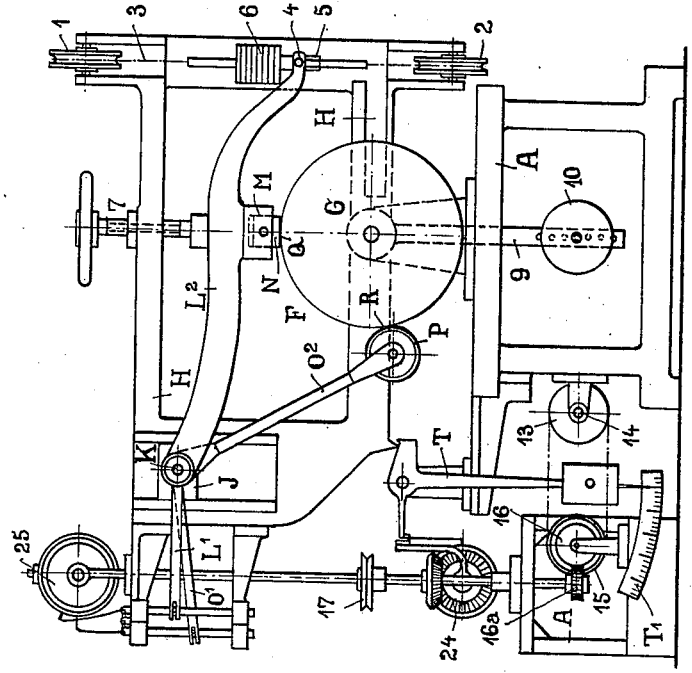
Figure 5:
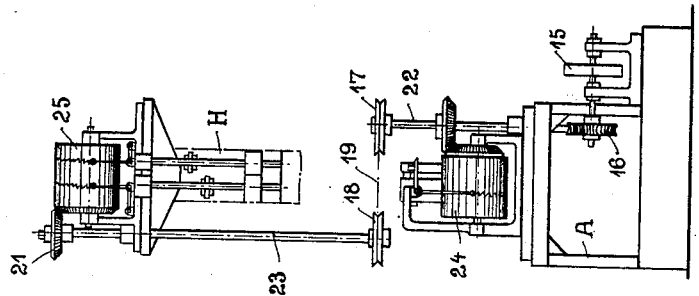

The testing machine may be further improved by the provision of suitable means for balancing and pressing on the test-piece, for varying the said pressure, for compensating oscillations of the apparatus and the like, which shall be described below in connection with Figs. 3 to 5, Fig. 3 being a front view of the machine, Fig. 4 a view of the right hand side and Fig. 5 a view of the left hand side. The same letters are used to indicate similar parts in Figs. 1 and 2.

The lever $L_2$ carrying the test-piece (or tool) N cannot only be pressed by a weight against the rotating tool (test-piece) F, but is pushed downwards or adjusted by a screw 7 journalled in the frame H. This permits of using in conjunction with the adjustable slide J the frame and lever in the manner of the tool rest of a lathe for holding turning tools or work pieces and enables the turning, boring and the like to be carried out undisturbed by the oscillations of the frame. The screw 7 must also be capable of being released from the lever $L_2$, so that the pressure by means of weight may be exerted with the lever, when grinding or testing bearings and lubricating oils.

In order that the indifferent equilibrium of the frame disturbed during the raising and lowering and also during the loading of the lever $L_2$ by means of the slide J and screw 7 may be at any time compensated, a pendulum 9 having an adjustable weight 10 and connected to the frame H is fixed on the shaft G in such a manner that, by raising and lowering the weight 10, the equilibrium may again be established.

Even with the one-sided loading of the lever $L_2$ by the weight S, as described the indifferent equilibrium of the frame is also disturbed. In order to be able to balance the lever together with test-piece or tool fixed to it, without disturbing the indifferent equilibrium of the frame, and to be able to load it at will, the free end of the lever $L_2$ is attached by means of a clamp 4 to a chain 3, which runs over pulleys 1 and 2. Slotted weights 6 may be placed on a clamp 5 on this chain. When balancing the lever $L_2$ attached to the chain, the weights 6 are first distributed according to the position of equilibrium of the lever and, only when the lever is loaded, are removed from one side and placed on the other, where the lever is attached by the clamp 4. The result of this arrangement is, that the weights loading the lever always exert the same turning moment on the rotatable frame H and that the lever may be balanced and loaded at will, without disturbing the position of equilibrium.

For registering the working resistance and the changes of shape two registering drums 24 and 25 are provided, the rotation of which is proportional to the number of revolutions of the machine tool. One of the registering drums 24, is mounted on the fixed standard A and the other one 25, on the movable frame H. The latter oscillating drum 25 is driven by transmitting the motion of the non-oscillating shaft 22 to the oscillating shaft 23 through the pulleys 17 and 18 and a cord or chain (rubber cord) 19, these pulleys 17 and 18 lying approximately level with the centre of rotation of the frame H and parallel with the longitudinal axis of the oscillating frame (of the shaft G), so that on the frame oscillating, no tangential forces interfering with the measurement are exerted by the cord 19 either to one side or the other. The drum 24 is driven from the shaft 22, which is itself driven from the shaft 14 (guide spindle of the lathe A) through the medium of the parts 13, 15, 16, $16^a$.

The mode of operation of the new machine should be quite clear from the above description, in so far as simple test pieces are concerned, which are inserted in the mount M and are tooled by the rotating tool F. As already stated, test piece and tool may change places, so that the former rotates, while the latter is stationary. This is for instance necessary in the testing of turning tools and the like.

The testing of all kinds of sliding and roller bearings and of lubricants is effected, besides in the manner described further on, by mounting the outer bearing in the mount M of the lever $L_2$, while the corresponding shaft is fixed to the rotating shaft B, which enables the frictional resistance of the bearing and lubricant to be measured for any bearing and for any oil at any load and speed.

It is essential for obtaining correct results, that the test should be carried out according to definite principles. Hitherto, for instance, the resistance to wear of a material was tested by grinding with rapidly rotating carborundum or emery wheels or rapidly rotating metal discs immersed in oil. The lubricating property of lubricating oil was tested by the sliding of metal on metal, using the oil to be tested. All these methods of testing have this in common, that the grinding discs and the like always act on the test piece in such a manner that on the one hand in the grinding operation the surface of the test piece or of the grinding disc (metal on metal) was smooth, that only very high grinding speeds were employed, that throughout the test the grinding was carried out at the same specific grinding pressure by the application of a constant pressure on a constant grinding surface and that during a test the same cylindrical surface of the grinding disc or grinding cylinder was used. Exhaustive research and experiments have shown that it is better to observe the following principles when testing, more particularly with the machine described above:

1. Before the test both the metal grinding disc and the test-piece are roughed by filing or other means and are freed from any smoothing lubricating medium.

2. The rubbing of the roughed metal rubbing disc against the roughed test-piece takes place slowly at a low rubbing speed, which is so calculated that the rubbing disc and the test-piece do not become smooth, but remain rough, which is effected by the surface particles of the metal rubbing disc and the test piece, on the roughed surface rubbing against each other slowly under pressure, breaking away in visible particles, while the surfaces become smooth with a rapid rubbing together of metal on metal.

3. During a single grinding test, grinding is carried out with a constantly varying specific grinding pressure. This is effected by the disc-shaped, i. e. relatively thin, flat test-piece, which is roughed on its face, being pressed against the roughed grinding disc, viz, against its cylindrical surface, as the tangential plane against a cylinder with a constant total pressure. In this original position the specific grinding pressure, which can be calculated by well known formulae, is greatest. The circular cylindrical surface grinds into the plane test piece, whereby the contact surface between disc and test-piece is continuously increased and the specific grinding pressure is continually decreased during the grinding test. By ascertaining and registering the grinding path, the corresponding grinding depth (the depth of the circular segment ground into the plane test piece) and the grinding work performed for each grinding depth, and by measuring the length and widening of the circular segment, the resistance to wear of the test-piece in question may be measured and registered.

4. The test-piece having been prepared in the manner described is moved during the test parallel to the axis of the cylinder, so that fresh parts of the grinding tool are always being used and its surface is worn off uniformly over the entire length and retains its cylindrical form.

The method described above under (3) and (4) has special advantages, when lubricating oils are being tested, the lubricating oil to be tested being fed between the rotating circular cylinder and the flat test-piece, which at first rests tangentially against it. At the initially very high specific pressure the circular disc is first ground into the flat test-piece, until at the specific pressure reduced by the grinding in the lubricating oil acts in such a lubricating manner that there is no further noticeable cutting action.

Having now described my invention, what I desire to secure by a patent of the United States is:

1. A testing machine for the purpose described comprising, in combination: two co-axial shafts and means for supporting them, a tool supported by one of the said shafts and being adapted to act on the test-piece at right angles with respect to the axis of rotation of the said shafts and to be acted on by the test-piece; a rocking frame supported by the other shaft and being adapted to hold one of said two members; means adapted to make the other of said members rotate around the axis of rocking of said frame; and a dynamometer so arranged as to be adapted to measure by the pressure exerted upon it by the said frame the tangential force transmitted from the rotating piece to the piece held in the frame, as set forth.

2. A testing machine for the purposes described, comprising, in combination; a lever adapted to carry the test-piece; a tool adapted to act on the test-piece and to be acted on by it; a rocking frame adapted to support said lever; indicating-means adapted to be actuated by the said lever and to show the amount of reduction of the material of said rotary tool and the wear of the two inter-acting materials; another lever contacting at its free end with the rotary tool and having its fulcrum co-axially with the fulcrum of said first lever; means adapted to be actuated by said second lever and to show only the amount of wear of the rotary lever, the length between the fulcrum and the point of contact of the second lever being equal to the length between said fulcrum and the point of contact of the test-piece with the rotating tool of the first-mentioned lever; a slide having the fulcrum-forming means for the two levers and being adapted to be so displaced at the rocking frame that said two equal lever-arms remain unaltered at different diameters of the rotary tool; and a dynamometer so arranged as to be adapted to measure by the pressure exerted upon it by the said rocking frame the tangential force transmitted from the rotary tool to the test-piece, as set forth.

3. A testing machine for the purpose described, comprising, in combination: a tool adapted to act on the test-piece and to be acted on by it; a rocking frame adapted to hold one of said two members; means adapted to make the other member rotate around the axis of said frame; indicators adapted to show the amount of reduction of the material of the rotary member and the wear of the two interacting materials, as well as to show the amount of wear of the said rotary member; a dynamometer so arranged as to be adapted to measure by the pressure exerted upon it by the said frame the tangential force transmitted from the rotating piece to the piece held in the frame; and means for supporting this frame, the indicators, and the dynamometer, and being adapted to make these thus combined parts an independent apparatus adapted to be mounted upon any machine upon which the test-piece rotates, as set forth.

4. A testing machine for the purposes described, comprising, in combination: a lever adapted to carry the test-piece; a tool adapted to act on the test-piece and to be acted on by it; a rocking frame adapted to support said lever; a registering appliance adapted to be actuated by the said lever and to show the amount of reduction of the material of said rotary tool and the wear of the two interacting materials; another lever contacting at its free end with the rotary tool and having its fulcrum co-axially with the fulcrum of said first lever: another registering appliance adapted to be actuated by said second lever and to show only the amount of wear of the rotary lever, the length between the fulcrum and the point of contact of the second lever being equal to the length between said fulcrum and the point of contact of the test-piece with the rotating tool of the first-mentioned lever; a slide having the fulcrum-forming means for the two levers and being adapted to be so displaced at the rocking frame that said two equal lever-arms remain unaltered at different diameters of the rotary tool; a dynamometer so arranged as to be adapted to measure by the pressure exerted upon it by the said rocking frame the tangential force transmitted from the rotary tool to the test-piece; and means for supporting this frame, the registering appliance, and the dynamometer, and being adapted to make these thus combined parts an independent apparatus adapted to be mounted upon any machine upon which the test-piece rotates, as set forth.

5. A testing machine for the purpose described, comprising, in combination: a lever adapted to carry the test-piece; a poise attached to the free end of said lever; a tool adapted to act on the test-piece and to be acted on by it; a rocking frame adapted to support said lever; indicating means adapted to be actuated by the said lever; another lever contacting at its free end with the rotary tool and having its fulcrum co-axially with the fulcrum of said first lever; other indicating means adapted to be actuated by said second lever, the length between the fulcrum and the point of contact of the second lever being equal to the length between said fulcrum and the point of contact of the test-piece with the rotating tool of the first mentioned lever; and a dynamometer so arranged as to be adapted to be actuated by the said rocking frame, as set forth.

6. A testing machne for the purpose described, comprising, in combination: a lever adapted to carry the test-piece; a tool adapted to act on the test-piece and to be acted on by it; a rocking frame adapted to support said lever, this latter being adapted to be fixed with respect to the frame in any position; a displaceable screw so arranged as to be adapted to effect said fixing; indicating means adapted to be actuated by the said lever; another lever contacting at its free end with the rotary tool and having its fulcrum lie co-axially with the fulcrum of said first lever; other indicating means adapted to be actuated by said second lever, the length between the fulcrum and the point of contact of the second lever being equal to the length between said fulcrum and the point of contact of the test-piece with the rotating tool of the first-mentioned lever; and a dynamometer so arranged as to be adapted to be actuated by the said rocking frame, as set forth.

7. A testing machine for the purposes described, comprising, in combination: a lever adapted to carry the test-piece; a tool adapted to act on the test-piece and to be acted on by it; a rocking frame adapted to support said lever; a pendulum affixed to the shaft of said frame and an adjustable poise secured to said pendulum; indicating means adapted to be actuated by the said lever; another lever contacting at its free end with the rotary tool and having its fulcrum co-axially with the fulcrum of said first lever; other indicating means adapted to be actuated by said second lever, the length between the fulcrum and the point of contact of the second lever being equal to the length between said fulcrum and the point of contact of the test-piece with the rotating tool of the first-mentioned lever; and a dynamometer so arranged as to be adapted to be actuated by the said rocking frame, as set forth.

8. A testing machine for the purposes described, comprising, in combination: a lever adapted to carry the test-piece; a tool adapted to act on the test-piece and to be acted on by it; a rocking frame adapted to support said lever; pulleys carried by the rocking frame; an endless flexible member connecting said pulleys with each other; poises adapted to be attached to said member and to be transposed from one side to the other side of the same; a connection between the free end of said lever and one side of said flexible member; indicating means adapted to be actuated by the said lever; another lever contacting at its free end with the rotary tool and having its fulcrum lie co-axially with the fulcrum of said first lever; other indicating means adapted to be actuated by said second lever, the length between the fulcrum and the point of contact of the second lever being equal to the length between said fulcrum and the point of contact of the test-piece with the rotating tool of the first-mentioned lever; and a dynamometer so arranged as to be adapted to be actuated by the said rocking frame, as set forth.

9. A testing machine for the purposes described, comprising, in combination: a lever adapted to carry the test-piece; a tool adapted to act on the test piece and to be acted on by it; a rocking frame adapted to support said lever, an upper chain wheel and a lower chain wheel carried by the rocking frame at one of its sides; an endless chain connecting said wheels with each other; a plurality of poises adapted to be attached to said chain and to be transposed from one side to the other side of the same; a connection between the free end of said lever and one side of the chain; indicating means adapted to be actuated by the said lever; another lever contacting at its free end with the rotary tool and having its fulcrum co-axially with the fulcrum of said first lever; the length between the fulcrum and the point of contact of the second lever being equal to the length between said fulcrum and the point of contact of the test-piece with the rotating tool of the first-mentioned lever; and a dynamometer connected with the said rocking frame and being located oppositely to said poises, as set forth.

10. A testing machine for the purposes described, comprising, in combination: a lever adapted to carry the test-piece; a tool adapted to act on the test-piece and to be acted on by it; a rocking frame adapted to support said lever, a registering drum mounted on the rocking frame; an axially movable shaft suspended from the drum carrier; means for transmitting rotary motion from said shaft to said drum; a vertical shaft and means for maintaining it in this position; means for rotating it; and means adapted to permit transmission of this rotary motion to the suspended shaft irrespective of the axial movements of the same; these latter means being located practically in the horizontal plane containing the axis of the said rocking frame; another lever contacting at its free end with the rotary tool and having its fulcrum co-axially with the fulcrum of said first lever, the length between the fulcrum and the point of contact of the second lever being equal to the length between said fulcrum and the point of contact of the test-piece with the rotating tool of the first-mentioned lever; and a dynamometer connected with the said rocking frame; as set forth.

11. A testing machine for the purposes described, comprising, in combination: a tool adapted to act on the test-piece and to be acted on by it, one of the two interacting materials operating with a flat surface, the other with a cylindrically curved one; means for pressing them against each other with a definite pressure; a rocking frame adapted to hold one of said two materials; means adapted to make the other of said materials rotate around the axis of rocking of said frame; and a dynamometer so arranged as to be adapted to measure by the pressure exerted upon it by the said frame the tangential force transmitted from the rotating piece to the piece held in the frame, as set forth.

12. In a testing machine, the combination of a rotary tool adapted to act on the test-piece at right angles with respect to its axis of rotation and to be acted on by it, a rocking frame, a frame member provided on said rocking frame for holding the test-piece, means adapted to make the said tool rotate around the rocking axis of said frame, means for yieldingly resisting the rocking of said frame and registering-appliances, so arranged as to be operated by the said rocking-frame and the said frame member holding the test-piece.

In testimony whereof I affix my signature in presence of two witnesses.

MOSES SPINDEL.

Witnesses:
  ALEXANDER DE SOTO,
  ALEXCI PHILIPPOFF.